Dec. 17, 1935.  A. KIRSCH  2,024,294
DETACHABLE HANDLE
Filed Feb. 25, 1935  2 Sheets-Sheet 1

Inventor
Andrew Kirsch
By *Clarence A. O'Brien*
Attorney

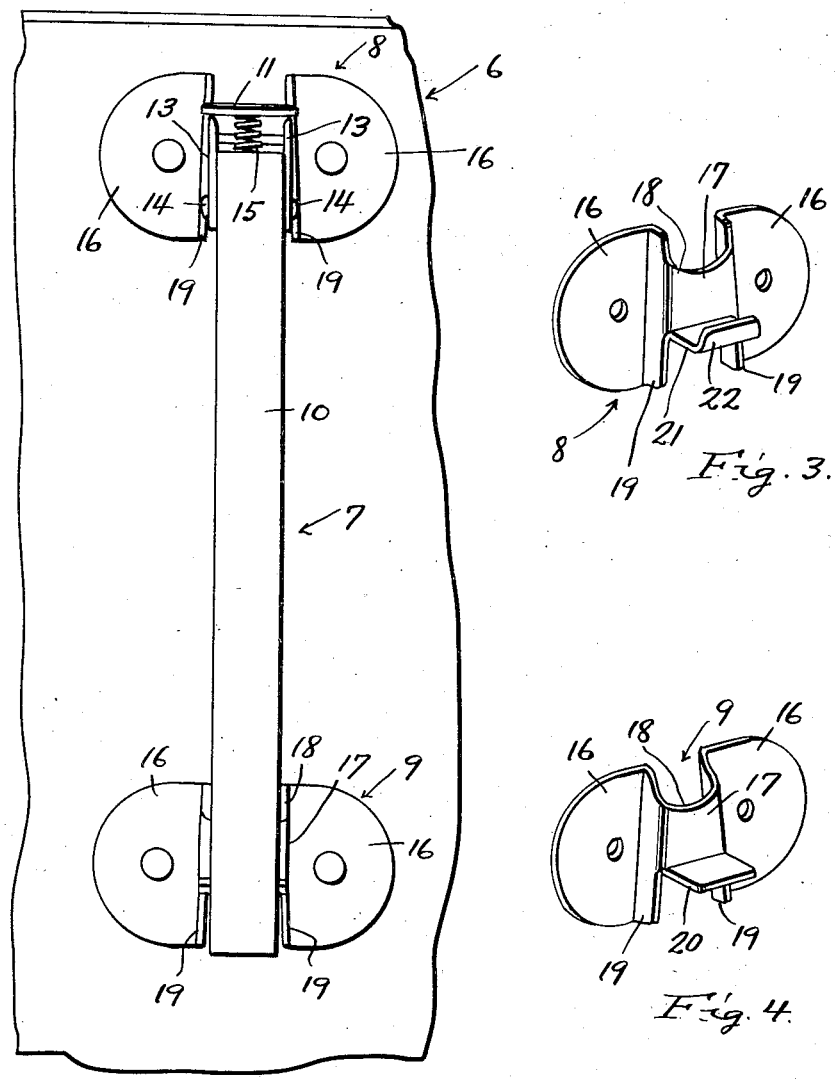

Patented Dec. 17, 1935

2,024,294

UNITED STATES PATENT OFFICE 2,024,294

DETACHABLE HANDLE

Andrew Kirsch, Carroll, Iowa

Application February 25, 1935, Serial No. 8,191

1 Claim. (Cl. 16—114)

This invention relates to a novel detachable handle and retaining fixtures therefor expressly designed for use and association with certain kitchen utensils, particularly tea and coffee pots.

It is a matter of universal knowledge that where a coffee percolator or pot is provided with a permanent handle, the handle when above the source of heat absorbs a certain amount of heat and becomes too hot to handle. In addition, the flame, especially from a gas burner which plays up and around the base of the pot frequently scorches and burns the handle, especially if it is wood. The result is that the handle is short lived and not as practicable as it might otherwise be.

In keeping with a desire to supply a handle which will overcome these objections and at the same time reflect appreciable features and advantages, I have, I believe, perfected one of an ingenious detachable character which will meet the demands of the trade and may receive the unqualified endorsement of those interested in structures in this particular line of endeavor.

Structurally, the improved arrangement, has to do with the adoption of a handle of substantially semi-horseshoe configuration whose ends terminate in laterally directed extensions constituting keeper removably receivable in keeper receptacles formed on a pair of substantially duplicate upper and lower attaching clips.

The lower attaching clip is unique in that it includes means to facilitate registering and piloting of the keeper into the keeper receptacle and is further provided with an abutment constituting a stop and cooperates intimately with an adjacent portion of the handle with a view toward stabilizing the connection to afford the requisite rigidity.

The upper attaching clip is distinctive and structurally different from similar devices in that it includes analogous features to those just recited, the lateral outstanding abutments conforming in shape to the adjacent portion of the handle and terminating in an upstanding terminal forming an appropriate retainer for a complemental spring pressed latch.

Other features and advantages may become apparent from the following description and drawings.

In the drawings:

Figure 2 is a view observing Figure 1 in a direction from right to left, the view being at right angles to Figure 1.

Figures 3 and 4 are isometric or perspective illustrations of the companion or complemental attaching clips.

Figures 1, 5:
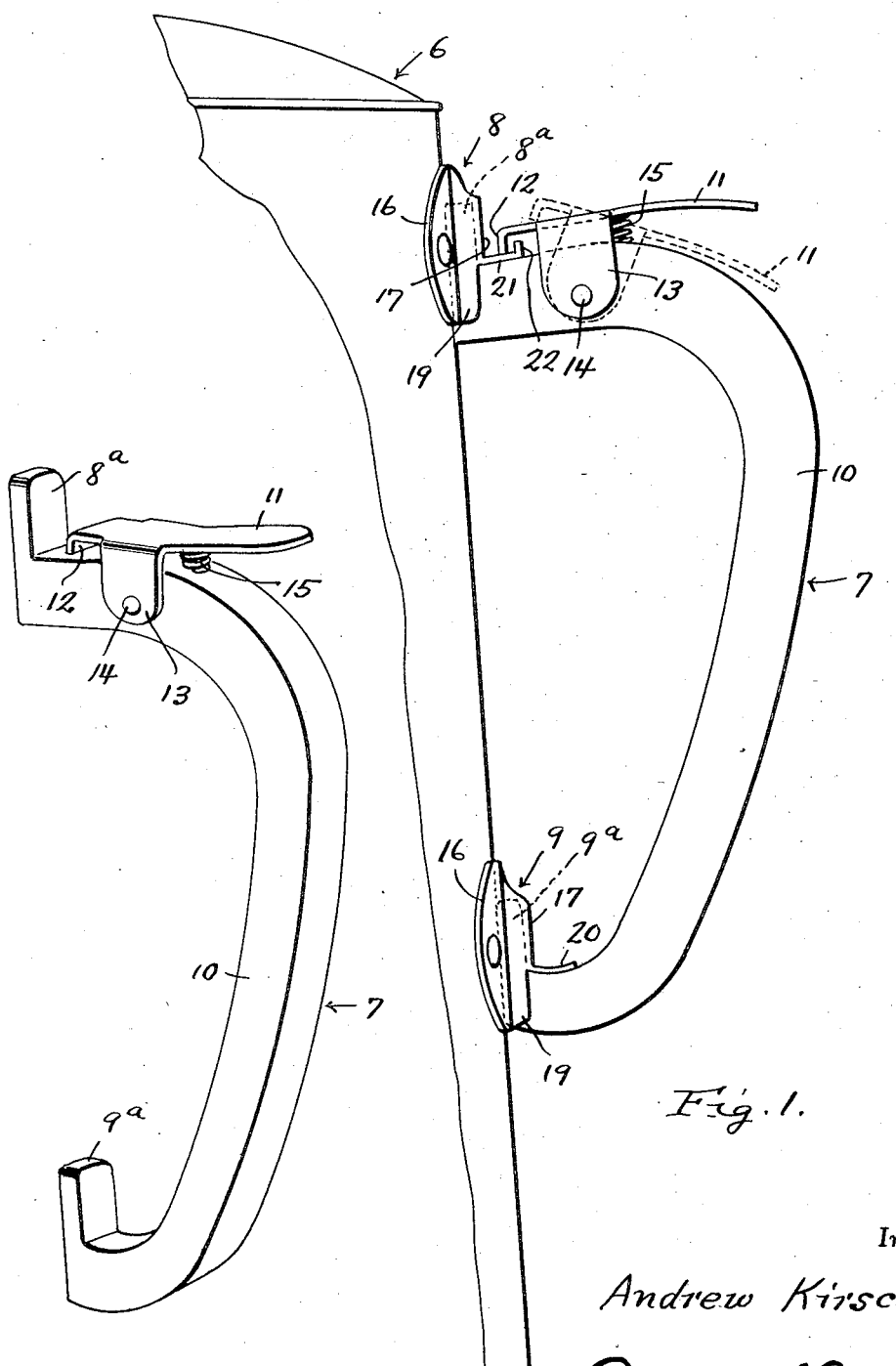
Figure 1 is a view in elevation showing a fragmentary portion of a conventional coffee pot provided with the improved detachable handle assemblage, as constructed in accordance with my ideas.
Figure 5 is a like type of view showing the handle per se to emphasize the improvement thereof.

In the drawings the coffee pot is indicated by the numeral 6, the detachable handle per se is differentiated by the numeral 7, the upper attaching clip is indicated at 8 and the lower one at 9. As before stated, the handle 7 includes a body portion 10 which may be said to be substantially semi-horseshoe shaped in configuration. This is somewhat the conventional shaping for a handle of this variety. It is preferably of wood so as to possess the requisite inherent insulating properties. The lower end is provided with an upstanding attaching lug in the form of a keeper 9a, this being for cooperation with the lower clip 9. A similar upstanding lug or keeper 8a is formed on the upper end of the handle for cooperation with the clip 8. The numeral 11 designates a handy depressible latch having its inner end down turned to form a fastener 12. The latch is formed with intermediate down turned attaching ears 13 which straddle and are pivotally attached as at 14 to the upper handle adjacent the keeper 8a. The numeral 15 is merely a coil spring which is interposed between the latch and handle for the purpose of keeping the latch in the full line position shown in Figure 1 and allowing it to be depressed to the dotted line position for convenient releasing purposes.

The two clips 8 and 9 are somewhat the same in construction. That is, each one is formed from a single metal stamping and includes a certain common feature. For example, each clip includes attaching flanges 16 with an intervening channel shaped portion 17 having its upper end notched as at 18, said channel shaped portion having a keeper receptacle for the adjacent keeper lug. The lower side wall portions of the receptacle indicated at 9 are spread apart and tapered sufficiently to facilitate insertion of the keeper lug as the handle is placed in position. The main difference in these two brackets or clips is that the struck-out web portion of the channel is bent outwardly at right angles to form an abutment or stop element. The stop element on the lower clip is distinguished by the numeral 20 and is somewhat curved to fit against the adjacent curved surface of the lower end portion of the handle 10 as illustrated in Figure 1.

This is for sake of safety and rigidity. The abutment on the upper clip 8 is distinguished by the numeral 21 and is substantially straight or flat to bear against the correspondingly shaped portion of the handle 10 and has its outer end upturned as indicated at 22 to form a retaining element for cooperation with the adjacent down-bent end 12 of the spring pressed latch. Thus the features 12 and 22 form the fastening means to prevent accidental displacement of the handle when once it is inserted into the adjacent or cooperating clips 8 and 9.

It is submitted that a handle assemblage of the type herein shown and described is simple, economical and a practicable expedient and well designed to fulfill the purposes for which it is intended. In addition to the requisites of strength and durability, the structure is distinctive as contrasted with similar arrangements in that it embodies the indispensable factor of symmetrical and uniform appearance, stability from a standpoint of balance. It follows, therefore, that it is an efficient adaptation aptly fitted to promote reliability and dependability so essention in a quick attachable handle arrangement for utensils of the variety mentioned. A careful selection and coaction of mechanical parts insures satisfactory results.

It is thought that persons skilled in the art to which the invention relates will be able to obtain a clear understanding of the invention after considering the description in connection with the drawings. Therefore, a more lengthy description is regarded as unnecessary.

Minor changes in shape, size and rearrangement of details coming within the field of invention claimed may be resorted to in actual practice, if desired.

Having thus described the invention, what is claimed as new is:

An attaching bracket of the class described comprising a substantially channel-shaped body, the side members being formed with laterally extending attaching flanges, said body tapering toward one end thereof, the lower portion of the web of the channel shaped body at the larger end being struck out and bent at right angles forming an abutment, and the free end thereof being bent upwardly forming a retaining element.

ANDREW KIRSCH.